United States Patent [19]

Adams, Jr. et al.

[11] Patent Number: 5,422,320

[45] Date of Patent: Jun. 6, 1995

[54] ALKALINE EARTH METAL SILICATE COMPOSITIONS FOR USE IN GLASS MANUFACTURE

[75] Inventors: Charles Adams, Jr.; Jerry A. Cook, both of Cartersville, Ga.

[73] Assignee: Chemical Products Corporation, Cartersville, Ga.

[21] Appl. No.: 230,108

[22] Filed: Apr. 20, 1994

[51] Int. Cl.⁶ .............................. C03C 6/02; C03C 6/08
[52] U.S. Cl. ...................................... 501/27; 501/29
[58] Field of Search ................................. 501/27, 29

[56] References Cited

U.S. PATENT DOCUMENTS

| | | | |
|---|---|---|---|
| 3,802,901 | 4/1974 | Robertson et al. | 501/29 |
| 3,941,574 | 3/1976 | Sarkisovich et al. | 501/27 |
| 4,028,131 | 6/1977 | Pons | 501/29 |
| 4,332,604 | 6/1982 | Propster | 501/29 |
| 4,806,331 | 2/1989 | Adams, Jr. et al. | 423/430 |
| 4,888,161 | 12/1989 | Adams, Jr. et al. | 501/27 |
| 4,888,308 | 12/1989 | Adams, Jr. et al. | 501/11 |
| 5,004,706 | 4/1991 | Dickenson | 501/27 |
| 5,100,840 | 3/1992 | Urabe et al. | 501/27 |
| 5,338,709 | 8/1994 | Planes et al. | 501/27 |
| 5,362,688 | 11/1994 | Porta et al. | 501/27 |

FOREIGN PATENT DOCUMENTS 0141016   4/1980   Germany .......................... 501/27

*Primary Examiner*—Mark L. Bell
*Assistant Examiner*—David R. Sample

[57] ABSTRACT

A granular product for use as a raw material for glass manufacture is composed of at least one alkaline earth metal silicate intimately admixed with at least one alkali metal carbonate or hydroxide. Glass containing fewer gas bubble inclusions and undissolved-particle defects can be produced more readily.

20 Claims, No Drawings

ALKALINE EARTH METAL SILICATE COMPOSITIONS FOR USE IN GLASS MANUFACTURE

BACKGROUND OF THE INVENTION

This invention involves the preparation of granular raw materials for use in glass manufacture which reduce gaseous emissions from the glass furnace and improve the operation of the grass furnace by promoting degassing of the glass batch. More specifically, this invention teaches the preparation of alkaline earth metal silicates intimately admixed with alkali metal carbonates or hydroxides.

Commercial production of glass conventionally involves feeding granular glass batch into an opening at one end of an elongated melting furnace while withdrawing melted glass through an opening at the opposite end of the furnace. The term "glass batch" refers to the granular raw materials (between about 0.1 mm and about 1 mm in diameter) for the glassmaking operation which have been physically mixed so as to yield the desired chemical composition after being melted into a homogeneous mass. The typical glass batch contains about 2.8 molecular weights of silica for each molecular weight of metal oxide.

Alkaline earth metals, together with alkali metals are ingredients in some glass formulations. The glass used for the production of face plates for color televisions sets contains up to about 10% strontium and up to about 10% barium by weight with lesser amounts of calcium and magnesium. The strontium and barium ions function as X-ray absorbers to prevent X-rays which are produced when the picture is generated from escaping from the TV set.

In producing television face plates, the economics of scale dictate that large continuous glass furnaces produce as much usable glass as possible. However, the quality of the finished face plate is critical; the presence in the glass of a tiny undissolved particle (called a "stone"), a tiny gas bubble (called a "seed"), or inhomogenity (called a "cold glass defect"), makes the face plate unusable and it must be broken up and remelted in the glass furnace. This broken glass, called "cullet", melts easily in the glass furnace and actually improves the glass furnace operation, however, both capacity and energy cost per ton of saleable glass product suffer when the "cullet ratio" in the glass batch is high.

The capacity of any particular glass furnace producing color television face plate glass is a direct function of how quickly the raw materials in the glass batch can be melted into a homogeneous glass that contains a minimum of stones, seeds, and inhomogeniety defects.

Alkaline earth metal carbonates and alkali metal carbonates are conventionally added to glass batches as the raw material source of alkaline earth metals and alkali metals, respectively. These carbonate raw materials release carbon dioxide during the glass-forming process in the glass furnace. The alkaline earth metal carbonates melt at higher temperatures than the alkali metal carbonates. Carbon dioxide release is believed to occur when the liquid phase in the glass furnace reacts chemically with the surfaces of the sand grains; this means that the alkaline earth metal carbonates, being the carbonates with the highest melting temperatures, are the last to enter the liquid phase and release carbon dioxide. They are thus more likely to contribute to "seeds" in the final glass product.

An issue which is likely to impact the glass industry in the future is the build-up in the atmosphere of carbon dioxide and other gases which absorb infrared radiation and which may contribute to global warming, the so-called "greenhouse effect". The glass industry can minimize emission of carbon dioxide by utilizing economically viable glass batch ingredients that melt and react to form a homogeneous glass more readily (thereby reducing the fossil fuel usage per ton of usable glass produced) and by substituting economically feasible replacements for the carbonate raw materials that are now being incorporated into the glass batch.

All of the sodium carbonate consumed by the glass industry in the United States is "natural" soda ash, that is, it was mined as a carbonate mineral and it underwent minimal chemical transformation prior to being sold as a product. In contrast, the barium and strontium carbonates supplied to the glass industry are derived from naturally-occuring sulfate minerals which first undergo chemical transformation to obtain water-soluble barium and strontium salts, then undergo a second chemical transformation as barium and strontium carbonate are precipitated from aqueous solutions of the respective water-soluble salts.

Alkaline earth metal silicates can be prepared in several ways. They can be precipitated from aqueous solutions of soluble alkaline earth metal salts; U.S. Pat. No. 4,612,292 teaches the precipitation of silicates having more than 2 molecular weights of $SiO_2$ for each molecular weight of alkaline earth metal oxide. They can be formed directly from the naturally-occuring sulfate minerals; the *Kirk-Othmer Encyclopedia of Chemical Technology*, Fourth Edition, Volume 3, page 915 states that barium sulfate can be reacted with silica to form barium orthosilicate:

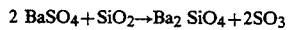

$$2\ BaSO_4 + SiO_2 \rightarrow Ba_2 SiO_4 + 2SO_3$$

which is transformed in hot water to barium metasilicate:

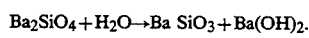

$$Ba_2SiO_4 + H_2O \rightarrow Ba\ SiO_3 + Ba(OH)_2.$$

A process developed by the U.S. Bureau of Mines produces hydrogen fluoride and calcium metasilicate from fluorosilicic acid (*Kirk-Othmer Encyclopedia of Chemical Technology*, Third Edition, Volume 10, page 746.)

Alkaline earth metal silicates can be characterized by the ratio of contained silica to contained metal oxide. The "molar ratio" is the number of molecular weights of silica contained in the material for each molecular weight of metal oxide. The term "metasilicate" refers to a molar ratio of 1.0, while "orthosilicate" refers to a molar ratio of 0.5.

Alkaline earth metal silicates having molar ratios below about 2 would not be conventionally considered candidates for use as glass furnace raw materials because of their high melting temperatures. They are primarily amorphous materials that can vary from almost 0% contained silica to almost 100% contained silica. *Phase Diagrams for Ceramists*, published by the American Ceramic Society, contains phase diagrams for the binary magnesium, calcium, strontium, and barium silicate systems.

The strontium silicate with the lowest melting point (1358° C.) is shown in *Phase Diagrams for Ceramists* to contain about 1.9 molecular weights of silica for each molecular weight of strontium oxide (53 weight percent silica). Discrete crystalline strontium silicate species are shown for molar ratios of 0.5 (melting point about 1750° C.) and 1.0 (melting point 1580° C.).

The barium silicate with the lowest melting point (1370° C.) is shown in *Phase Diagram for Ceramists* to contain 2.9 molecular weights of silica for each molecular weight of barium oxide (53 weight percent silica). This explains the teaching in U.S. Pat. No. 4,612,292 that the silicate products that are "admirable glass-formers" should contain more than 2 and preferably more than 3 molecular weights of silica for each molecular weight of metal oxide. Discrete crystalline barium silicates are shown having molar ratios of 0.5 (melting point above 1750° C.); 1 (melting point 1550° C.); 1.5, 1.6, 1.7, and 2.0 (melting points between 1420 and 1450° C.).

Sodium carbonate melts at a temperature of 851° C.; potassium carbonate melts at a temperature of 891° C. As the glass batch is heated in the glass furnace, the alkali metal carbonates melt and begin to react with the surface of the sand grains present in the glass batch. They may also drain away from the other glass batch ingredients causing inhomogeniety in the glass furnace. U.S. Pat. No. 3,817,776 (Granular Free-Flowing Material for Use in the Manufacture of Glass, M. Gringras) teaches the "fixing" of the sodium by pre-reacting sand and sodium hydroxide to form a coating of sodium metasilicate on the sand grains. The sodium metasilicate has a melting point of 1088° C., so it is claimed that the sodium remains "fixed" until the glass batch reaches a higher temperature and a more homogeneous melt is achieved. This patent teaches a heat treatment after sodium hydroxide solution is sprayed onto the sand grains to obtain the desired chemical reaction.

SUMMARY OF THE INVENTION

The present invention provides a cost-effective means of reducing carbon dioxide emissions from the glass furnace while increasing the rate at which a glass batch can be melted into a homogeneous liquid. Alkaline earth metal silicates are prepared in a finely divided form which contain more than about 0.5 and less than about 2.0 molecular weights of silica for each molecular weight of alkaline earth metal oxide. This encompasses all of the crystalline barium and strontium silicate species described previously as well as amorphous silicates. A granular product containing alkaline earth metal silicate in intimate physical admixture with one or more alkali metal carbonates or hydroxides is prepared such that the product contains at least about 5 weight percent alkali metal carbonate or hydroxide and preferably up to about 50 weight percent alkali metal carbonate or hydroxide. The function of the alkali metal carbonate or hydroxide within the granular product is to improve the melting/dissolving/reacting characteristics of the normally refractory lower-molar-ratio alkaline earth metal silicates to render them superior glass batch raw materials.

DETAILED DESCRIPTION OF THE INVENTION

It has been discovered that the crystalline alkaline earth metal silicates, as well as amorphous alkaline earth metal silicates, having a molar ratio below about 2 can be used as granular glass batch raw materials if they are incorporated into granules containing the alkaline earth metal silicate in finely divided form and in intimate admixture with alkali metal carbonate or hydroxide.

The presence of the alkali metal carbonate or hydroxide enhances the dissolution of the alkaline earth metal silicate into the molten glass. The mechanism of this enhancement is not well understood, however one hypothesis might be that the lower ratio alkaline earth metal silicates exhibit a significant solubility in liquid alkali metal carbonates and hydroxides. While not being bound by this hypothesis, it explains the observation that it is preferable for the alkaline earth metal silicates to be in finely divided form and the observation that it is preferable for the product of the present invention to contain at least 20 weight percent alkali metal carbonate or hydroxide.

From an economic perspective, it is most preferable to form the product of the present invention from alkaline earth metal silicates that have been produced without heating them to their melting temperatures, so less energy is consumed and grinding of the alkaline earth metal silicate to obtain a finely divided form is not required. The alkaline earth metal silicate, produced by precipitation from an aqueous system or by high temperature reaction at a temperature below the silicate's melting temperature, is most preferably intimately admixed with sodium carbonate, an ingredient in the glass batches to which the product of the present invention will be added.

The alkaline earth metal silicate and the alkali metal carbonate are most preferably intimately admixed in the presence of 15 to 25 weight percent water, based on the weight of the entire composition, in a pad, die mixer. The plastic mass is then preferably dried such that the composition reaches a temperature of 120° C. to insure dryness, and then crushed and sized to obtain a granular product that is substantially all below 1.0 mm diameter and larger than 0.1 mm diameter.

In order to further illustrate the present invention and the advantages it offers, the following specific examples are given. These examples are only illustrative and are not intended to be limiting in any way.

EXAMPLE 1

Barium hydroxide and silica flour were mixed in the proportion of one gram-molecular weight of barium to one gram-molecular weight of silicon. The mixture was melted in a platinum crucible to form barium metasilicate.

One portion of the barium metasilicate was crushed only to the extent that the particles were substantially all smaller than about 1 millimeter in diameter. Another portion of the barium metasilicate was ground to a fine powder, admixed with 20 weight percent potassium carbonate and 15 weight percent water, dried, and crushed to yield granules substantially all of which were below 1 millimeter in diameter.

Glass batches were prepared from commercially available glass-grade sand, sodium carbonate, and potassium carbonate; and utilizing the barium metasilicate granules in one batch and the product of the present invention in a second batch to yield the following glass composition.

7.6 gram molecular weights BaO
6.0 gram molecular weights sodium oxide
4.1 gram molecular weights potassium oxide
47.8 gram molecular weights silicon oxide
This glass has a molar ratio of 2.70.

The two glass batch samples were melted in 250 cubic centimeter covered platinum crucibles at 1400° C. for 45 minutes. The undissolved particles and gas bubbles were counted in each glass sample after cooling and are reported below as the number that would be found in one cubic inch of glass.

| Glass batch Raw Material | Gas bubbles number/cubic inch | Undissolved Particles number/cubic inch |
| --- | --- | --- |
| 1. Granular barium silicate | 400 | 640 |
| 2. Product of the Present Invention | 640 | 200 |

Using the undissolved particle count as a guide to meltability, it is apparent that the product of the present invention is superior. The higher number of gas bubbles is consistent with a glass batch that has progressed further toward complete melting in that the carbonates should have decomposed more completely to carbon dioxide gas and the metal oxide. Note that the same amount of carbon dioxide will be generated from each of the glass batches.

EXAMPLE 2

Barium silicate having a molar ratio of 1.0 was precipitated from a 16 weight percent aqueous solution of barium sulfide. The precipitate was filtered from suspension and washed to remove sulfide.

The finely divided barium silicate in the filter cake was admixed with 10 weight percent sodium carbonate, dried, and crashed to yield granules that were substantially all below 1.0 millimeter in diameter.

Glass batches were prepared to yield the same glass composition as in Example 1 using the granular product prepared as described above in one batch and a commercially available barium carbonate product used in the glass industry as a source of barium, Barium Carbonate Type S produced by Chemical Products Corporation, in a second batch.

Even though glass batches were prepared to yield glass of the same composition as in Example 1, the glass batch containing the Barium Carbonate Type S product will generate 75% more carbon dioxide during glass formation than the glass batch containing the barium silicate composition of the present invention.

The glass batches were melted as described in Example 1, and the gas bubbles and undissolved particles observed in each sample are reported below.

| Glass batch Raw Material | Gas bubbles number/cubic inch | Undissolved Particles number/cubic inch |
| --- | --- | --- |
| 1. Product of the Present Invention | 600 | 240 |
| 2. Barium Carbonate Type S | 1220 | 360 |

Once again, using the undissolved particle count as a guide to meltability, it is apparent that the product of the present invention is superior to the commercially available granular barium carbonate product, Type S, manufactured by Chemical Products Corporation.

This invention has been described in terms of various preferred embodiments; those skilled in the art will appreciate that various modifications and substitutions may be made without departing from the spirit of this invention. It is intended that the scope of the present invention be limited solely by the scope of the following claims.

We claim:

1. A granular material for use as glass furnace feed composed of fine particles of one or more alkaline earth metal silicates intimately admixed with at least one alkali metal carbonate to form granules larger than about 0.1 mm equivalent spherical diameter and smaller than about 1 mm equivalent spherical diameter.

2. The granular material of claim 1 in which the alkaline earth metal silicate contains between about 0.5 and about 2.0 gram-molecular weights of silicon oxide for each gram-molecular weight of alkaline earth metal oxide.

3. The granular material of claim 1 in which the alkali metal carbonate makes up at least 5 weight percent of the granular material.

4. The granular material of claim 1 in which the alkaline earth metal silicate is strontium silicate.

5. The granular material of claim 1 in which the alkaline earth metal silicate is barium silicate.

6. The granular material of claim 1 in which the alkaline earth metal silicate contains both barium and strontium.

7. The granular material of claim 1 which contains discrete fine granules of barium silicate and discrete fine granules of strontium silicate.

8. The granular material of claim 1 in which the alkali metal carbonate is sodium carbonate.

9. The granular material of claim 1 in which the alkali metal carbonate is potassium carbonate.

10. The granular material of claim 1 in which the alkali metal carbonate contains both sodium and potassium.

11. The granular material of claim 1 in which the alkaline earth metal silicate contains 1 gram-molecular weight of silicon oxide for each gram-molecular weight of alkaline earth metal oxide.

12. The granular material of claim 11 which contains 61 weight percent strontium silicate and 39 weight percent sodium carbonate.

13. The granular material of claim 11 which contains 61 weight percent barium silicate and 39 weight percent potassium carbonate.

14. A granular material for use as feed to a glass furnace produced by (1) admixing water, fine particles of an alkaline earth metal silicate, and an alkali metal carbonate or hydroxide to form a highly viscous paste; (2) removing the water from this paste through drying at an elevated temperature; (3) crushing and sizing the dried paste to yield granules which are larger than about 0.1 millimeter and are smaller than about 1.0 millimeter in size.

15. The granular material of claim 14 in which the fine particles of alkaline earth metal silicate are substantially all smaller than 0.05 millimeter equivalent spherical diameter.

16. The granular material of claim 14 in which the alkaline earth metal silicate is strontium silicate.

17. The granular material of claim 14 in which the alkaline earth metal silicate is barium silicate.

18. A granular material for use as feed to a glass furnace produced by (1) admixing fine particles of at least one alkaline earth metal silicate and at least one alkali metal carbonate or hydroxide with or without the presence of water, (2) heating the admixture to a temperature high enough to effect at least partial melting of the alkali metal carbonate or hydroxide component, (3) cooling and crushing the admixture to produce granules which are larger than about 0.1 millimeter in diameter and which are smaller than about 1.0 millimeter in diameter.

19. The granular material of claim 18 in which the alkali metal carbonate consists of a mixture of sodium carbonate and potassium carbonate.

20. The granular material of claim 18 in which the alkaline earth metal silicate contains about 2 gram-molecular weights of silicon oxide for each gram-molecular weight of alkaline earth metal oxide.

* * * * *